United States Patent
Kii et al.

(10) Patent No.: US 7,430,565 B2
(45) Date of Patent: Sep. 30, 2008

(54) INFORMATION PROCESSING APPARATUS, INFORMATION PROCESSING METHOD, AND COMPUTER PROGRAM

(75) Inventors: Manabu Kii, Tokyo (JP); Masahiro Shimizu, Saitama (JP); Takamichi Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 472 days.

(21) Appl. No.: 10/978,918

(22) Filed: Nov. 1, 2004

(65) Prior Publication Data

US 2005/0154747 A1 Jul. 14, 2005

(30) Foreign Application Priority Data

Oct. 30, 2003 (JP) .............................. 2003-369971

(51) Int. Cl.
*G06F 17/30* (2006.01)

(52) U.S. Cl. ................................... 707/104.1; 707/102

(58) Field of Classification Search ................. 707/102, 707/104.1
See application file for complete search history.

(56) References Cited

U.S. PATENT DOCUMENTS

| | | | | |
|---|---|---|---|---|
| 6,954,763 | B2 * | 10/2005 | Nunome et al. ............. | 707/102 |
| 2002/0147728 | A1 * | 10/2002 | Goodman et al. ........ | 707/104.1 |
| 2005/0055375 | A1 * | 3/2005 | Torii et al. ................ | 707/104.1 |
| 2005/0144181 | A1 | 6/2005 | Kii et al. | |
| 2007/0078895 | A1 * | 4/2007 | Hsieh et al. .............. | 707/104.1 |

FOREIGN PATENT DOCUMENTS

| | | |
|---|---|---|
| JP | 09-265765 | 10/1997 |
| JP | 2000-041209 A | 2/2000 |
| JP | 2000-083217 A | 3/2000 |
| JP | 2001-243751 A | 9/2001 |
| JP | 2002-163861 A | 6/2002 |
| JP | 2003-022656 A | 1/2003 |
| JP | 2003-051179 A | 2/2003 |

* cited by examiner

*Primary Examiner*—John Cottingham
*Assistant Examiner*—Noosha Arjomandi
(74) *Attorney, Agent, or Firm*—Wolf, Greenfield & Sacks, P.C.

(57) ABSTRACT

An apparatus and method is disclosed which can efficiently execute construction of a contents management database and setting of a reproduction list. The information processing apparatus includes a storage section for storing a plurality of pieces of contents and a data processing section. The data processing section sets a directory having a tree structure, sets layer attribute information representative of attributes of layers which form the tree structure, and coordinates each of pieces of the layer attribute information with a group which includes contents or a group belonging to a lower layer than the layer indicated by the piece of the layer attribute information to produce a group tree as a contents management directory composed of the groups and the contents.

16 Claims, 12 Drawing Sheets

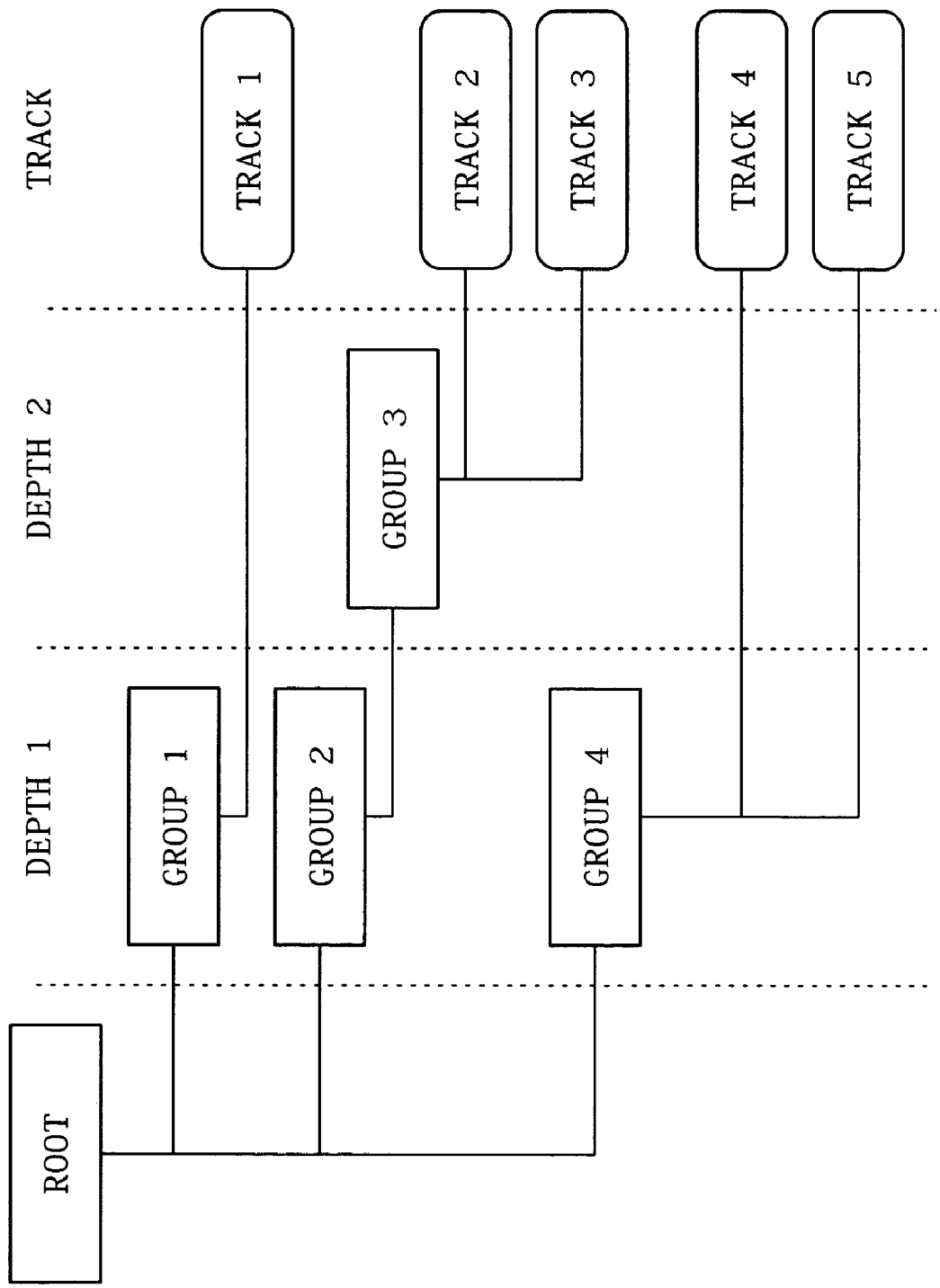

FIG. 3

| DEPTH TYPE | VALUE | EXPLANATION |
|---|---|---|
| TALB | 54414C42h | ALBUM NAME |
| TIT2 | 54495432h | TITLE |
| TPE1 | 54504531h | MAIN ARTIST NAME |
| TCOM | 54434F4Dh | COMPOSER |
| PCNT | 50434E54h | NUMBER OF PLAYING TIMES |
| POPM | 504F504Dh | POPULARITY METER |
| TBPM | 5442504Dh | BPM (BEATS PER MINUTE) |
| TEXT | 54455854h | LYRICIST |
| TYER | 54594552h | YEAR OF RELEASE |
| TRDA | 54524441h | RECORDING DATE |
| TPUB | 54505542h | LABEL NAME |
| TCON | 54434F4Eh | GENRE |
| TOWN | 544F574Eh | OWNER/LICENSEE OF FILE |
| TENC | 54454E43h | ENCODING PERSON |
| TKEY | 544B4559h | KEY |
| TDRL | 5444524Ch | DATE AND HOUR OF RELEASE |
| TMOO | 544D4F4Fh | MOOD |
| RATE | 52415445h | RATE |
| OBTF | 4F425446h | SOURCE OF ACQUISITION |
| CTRY | 43545259h | NAME OF COUNTRY |

GROUP TREE LIST FILE

| 00h | FILE HEADER |
|---|---|
|  | SYSTEM BLOCK |
|  | GROUP TREE LIST BLOCK |

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| +00h | BLOCK ID =47544C42h | | | | CHILD NUM =N | | CHILD SIZE =0050h | | RE-SERVED | | TOTAL TREE NUM | | RESERVED | | | |
| +10h | TREE ITEM 1 |||||||||||||||||
|  | : |||||||||||||||||
|  | TREE ITEM N |||||||||||||||||
|  | PADDING |||||||||||||||||

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| +00h | GP TREE FILE NO | | TREE TYPE | | RESERVED ||||||||||||
| +10h | DEPTH SIZE | | RE-SERVED | | DEPTH TYPE 1 |||| DEPTH TYPE 2 |||| DEPTH TYPE 3 ||||
| +20h | DEPTH TYPE 4 |||| DEPTH TYPE 5 |||| DEPTH TYPE 6 |||| DEPTH TYPE 7 ||||
| +30h | RESERVED ||||||||||||||||
| +40h |  ||||||||||||||||

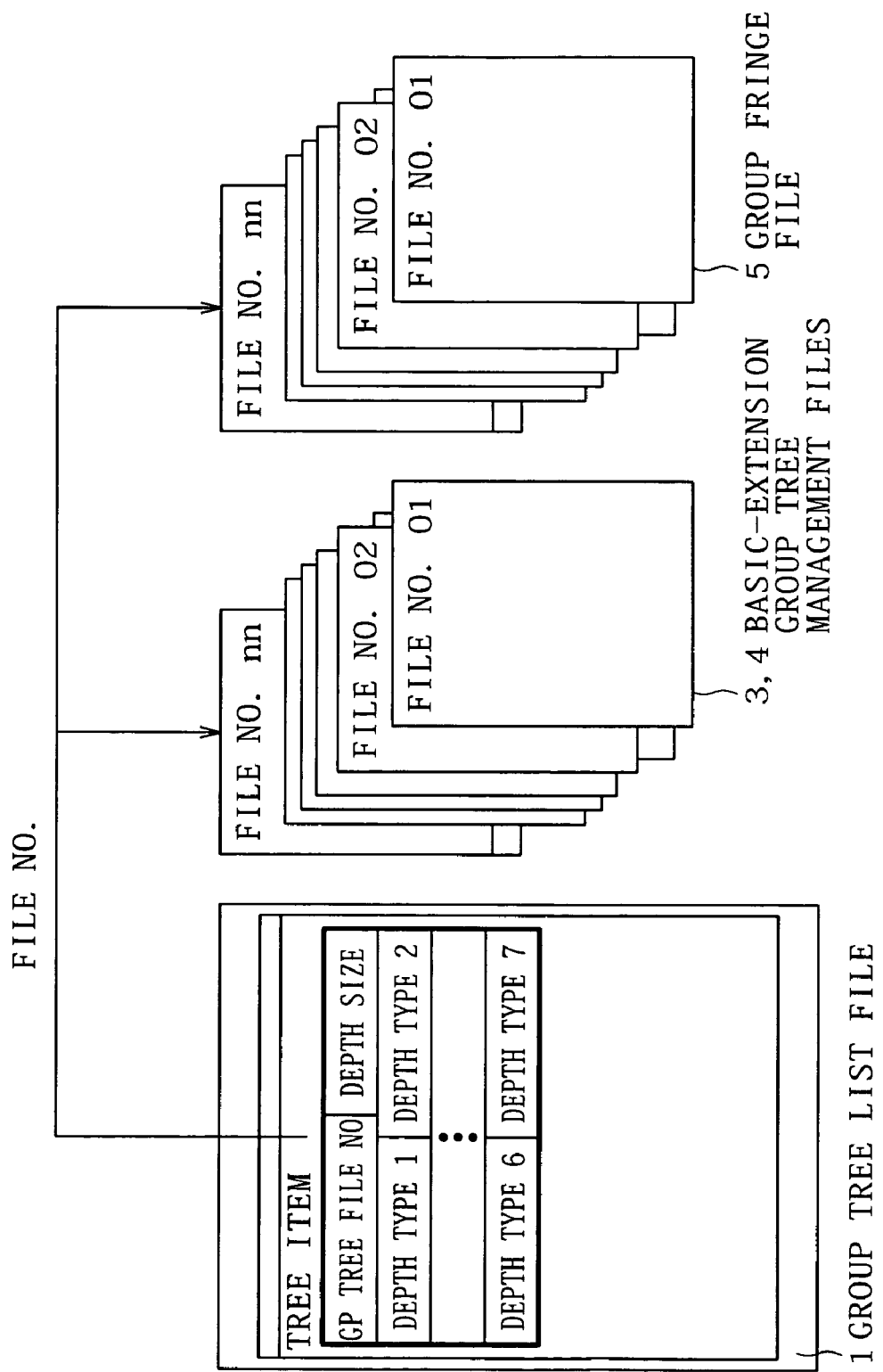

FIG. 7A

BASIC-EXTENSION GROUP TREE MANAGEMENT FILE

| 00h | FILE HEADER |
|---|---|
| | GROUP PLAYLIST BLOCK |
| | TRACK PLAYLIST BLOCK |

FIG. 7B

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| +00h | BLOCK ID =54504C42h | | | | CHILD NUM =N | | CHILD SIZE =0002h | | RE- SERVED | | TOTAL TRACK NUM | | RESERVED | | | |
| +10h | TRACK ITEM 1 | | TRACK ITEM 2 | | TRACK ITEM 3 | | TRACK ITEM 4 | | TRACK ITEM 5 | | TRACK ITEM 6 | | TRACK ITEM 7 | | TRACK ITEM 8 | |
| | : | | | | | | | | | | | | | | | |
| | | | | | | | | | TRACK ITEM N | | | | | | | |
| | PADDING | | | | | | | | | | | | | | | |

FIG. 7C

| | 0 | 1 |
|---|---|---|
| +00h | CONTENT FILE NO | |

FIG. 8A

GROUP FRINGE FILE

| 00h | FILE HEADER |
|---|---|
|  | GROUP FRINGE BLOCK |

FIG. 8B

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| +00h | BLOCK ID =47504642h | | | | CHILD NUM =N | | CHILD SIZE | | RESERVED | | | | | | | |
| +10h | GROUP FRINGE 1 | | | | | | | | | | | | | | | |
|  | : | | | | | | | | | | | | | | | |
|  | GROUP FRINGE N | | | | | | | | | | | | | | | |
|  | PADDING | | | | | | | | | | | | | | | |

FIG. 8C

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| +00h | RESERVED | | | | | | | | PLAY TIME | | | | NUM STRING | | STRING SIZE=0 080h | |
| +10h | STRING FRAME 1 | | | | | | | | | | | | | | | |
| +90h | STRING FRAME 2 | | | | | | | | | | | | | | | |
|  | : | | | | | | | | | | | | | | | |
|  | STRING FRAME N | | | | | | | | | | | | | | | |

FIG. 8D

| FRAME ID | VALUE | EXPLANATION |
|---|---|---|
| TIT2 | 54495432h | TITLE |
| TPE1 | 54504531h | MAIN ARTIST NAME |
| TALB | 54414C42h | ALBUM NAME |
| TCON | 54434F4Eh | GENRE |
| TSOP | 54534F50h | MAIN ARTIST'S INITIALS |

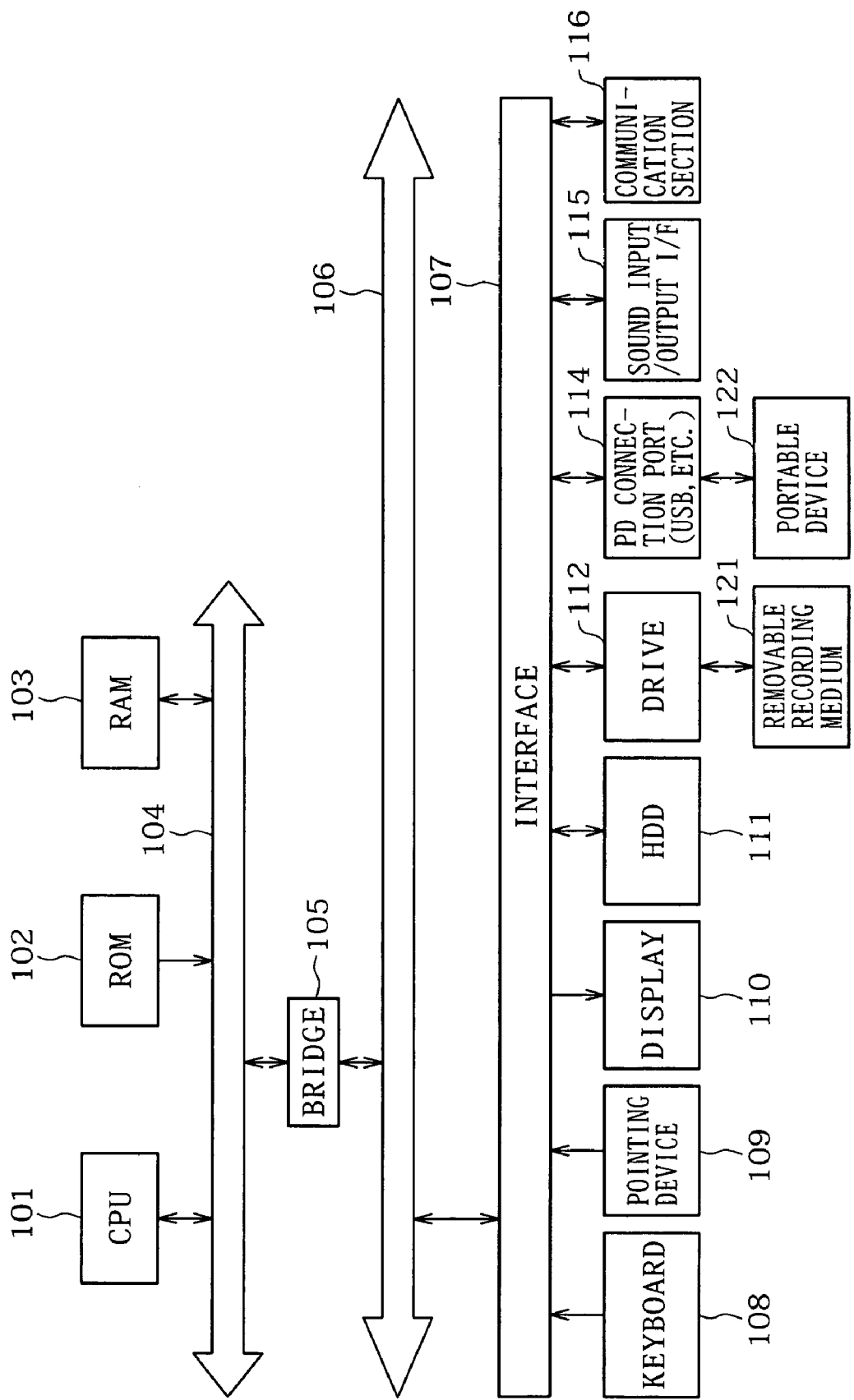

INFORMATION PROCESSING APPARATUS, INFORMATION PROCESSING METHOD, AND COMPUTER PROGRAM

BACKGROUND OF THE INVENTION

This invention relates to an information processing apparatus, an information processing method, and a computer program. More specifically, the present invention relates to an information processing apparatus, an information processing method, and a computer program wherein contents are defined as groups and production of a database for management of the contents and setting of a contents reproduction list can be performed based on the defined groups.

Recently, data recording media having a large capacity such as a flash memory and a small-size hard disk have been popularized. Such a data recording medium having a large capacity as just mentioned prevails to be incorporated in information processing apparatus such as personal computers (PC) and contents reproduction apparatus such as portable devices.

Such a data recording medium having a large capacity as mentioned above can store a great number of pieces of music contents, and a great amount of such contents data is managed typically based on a directory configuration set in advance. As general contents management configurations, a management configuration having a layered configuration and a management configuration wherein contents are classified into various categories are available. For example, in order to improve the facility in search of object data (contents) or the facility in arrangement by a user, various management configurations have been proposed.

For example, Japanese Patent Laid-open No. 2003-22656 (hereinafter referred to as Patent Document 1) discloses a data management configuration having a layered configuration. In particular, only data which belong to the same category are recorded and managed in the same layer to achieve efficient data search. Meanwhile, Japanese Patent Laid-open No. 2002-288017 (hereinafter referred to as Patent Document 2) discloses a configuration which enhances the facility in search of a contents file by a user. To this end, the Patent Document 2 discloses a file management configuration having a layered configuration wherein a marking of a file belonging to a predetermined holder and a marking of a file belonging to a subfolder of the folder are displayed with the same form as that in a case wherein the files are kept in the same folder.

Although various configurations have been proposed for a contents management configuration of a database and are directed to improvement in facility in search of contents stored in a database, they do not necessarily have a directory configuration conforming to the preference of a user.

Further, when contents are successively acquired from a database to perform continuous reproduction of a plurality of pieces of contents, it is necessary to produce a contents reproduction list (play list) in which a contents reproduction order is set. The contents reproduction list (play list) can be produced by a process by a user of arbitrarily selecting contents and combining the selected contents into a list or a like process.

However, production of a reproduction list involves complicated processes such as a process of selecting contents from among a large number of pieces of contents and a process of sequentially setting the selected contents. Particularly, in order to set a large number of pieces of contents to a preproduction list, it is necessary to perform a search process for a large number of pieces of contents one by one for each piece of contents. Therefore, there is a problem that, as the number of pieces of contents to be set to a reproduction list increases, the difficulty in construction of a reproduction list increases.

SUMMARY OF THE INVENTION

It is an object of the present invention to provide an information processing apparatus, an information processing method, and a computer program wherein a database having a contents directory configuration conforming to the preference of a user can be constructed.

It is another object of the present invention to provide an information processing apparatus, an information processing method, and a computer program wherein a reproduction list can be produced efficiently in accordance with construction of a database.

In order to attain the objects described above, according to the present invention, a contents management configuration of a database and a reproduction list configuration are associated with each other, and a plurality of pieces of contents are classified into groups, for example, for particular categories. Further, the groups are layered and arranged to form the contents management configuration.

More particularly, according to an aspect of the present invention, there is provided an information processing apparatus including a storage section for storing a plurality of pieces of contents, and a data processing section for setting a directory having a tree structure, setting layer attribute information representative of attributes of layers which form the tree structure, and coordinating each of pieces of the layer attribute information with a group which includes contents or a group belonging to a lower layer than the layer indicated by the piece of the layer attribute information to produce a group tree as a contents management directory composed of the groups and the contents.

According to another aspect of the present invention, there is provided an information processing apparatus, including a storage section for storing a plurality of pieces of contents, and a control section for producing a group tree list file formed from group tree identification information for identification of group trees having a tree structure, layered order information representative of a layer order of layers of each of the group trees, and layer attribute information representative of attributes of the layers, a group tree management file representative of the group tree identification information for identification of the group trees and a reproduction order of the contents belonging to the group trees, and a group attribute information file representative of attributes of the groups.

According to a further aspect of the present invention, there is provided an information processing method for producing a group tree as a contents management directory formed from groups and a plurality of pieces of contents and used for management of the contents, including the steps of setting a directory having a tree structure, setting layer attribute information representative of attributes of layers included in the tree structure, and setting each of pieces of the layer attribute information with a group which includes contents or a group belonging to a lower layer than the layer indicated by the piece of the layer attribute information in a coordinated relationship with each other.

According to a still further aspect of the present invention, there is provided a program for producing a group tree as a contents management directory formed from groups and a plurality of pieces of contents and used for management of the contents, including the steps of setting a directory having a tree structure, setting layer attribute information representative of attributes of layers included in the tree structure, and setting each of pieces of the layer attribute information with a group which includes contents or a group belonging to a lower layer than the layer indicated by the piece of the layer attribute information in a coordinated relationship with each other.

According to a yet further aspect of the present invention, there is provided a contents browsing apparatus, including a storage section for storing a plurality of pieces of contents, a display section for displaying the substance of the contents, and a control section for controlling the display section to display the substance of the contents based on a group tree list file formed from group tree identification information for identification of group trees having a tree structure, layered order information representative of a layer order of layers of each of the group trees and layer attribute information representative of attributes of the layers, a group tree management file representative of the group tree identification information for identification of the group trees and a reproduction order of the contents belonging to the group trees, and a group attribute information file representative of attributes of the groups.

In the information processing apparatus and method, program, and contents browsing apparatus, a directory having a tree structure is set as a management directory for a plurality of pieces of contents stored in a storage section, and layers included in the tree structure are set as layer definition depths which define attributes. Further, to each of the layer definition depths, a group which includes contents of a lower layer or a group belonging to a lower layer than the layer indicated by the piece of the layer definition depth is set in a coordinated relationship to produce a group tree as a contents management directory formed from groups and contents. Consequently, construction of a user-oriented database conforming to the preference of a user can be executed efficiently through a setting process of a group tree having depths to which attributes conforming to the preference of the user such as "title" or "artist" are set. Accordingly, the present invention can be applied effectively to a PC or a portable device which incorporates a hard disk, a flash memory, or a like element which can store a large number of pieces of contents.

Further, in the information processing apparatus and method, program, and contents browsing apparatus, since a group tree management file in which contents reproduction order information is placed is produced in a coordinated relationship with a group tree, the user can perform an efficient production process of a reproduction list together with the construction of a database. Accordingly, the present invention can be applied to a PC or a portable device which incorporates a hard disk, a flash memory, or a like element which can store a large number of pieces of contents and executes contents reproduction in accordance with a reproduction list.

The above and other objects, features, and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a diagrammatic view showing an example of a configuration of a group tree which is produced by the information processing apparatus and has depths for which attributes can be defined;

FIG. 3 is a view illustrating a depth attribute table in which information of attributes which can be defined for depths of a group tree which has depths for which attributes can be defined;

FIG. 5 is a diagrammatic view illustrating a coordinated relationship among the group tree list file, group tree management files, and group fringe files;

FIGS. 6A to 6C and 7A to 7C are views illustrating a detailed configuration of a group tree management file produced by or applied to the information processing apparatus;

FIGS. 8A to 8D are views illustrating a detailed configuration of a group fringe file produced by or applied to the information processing apparatus;

FIG. 12 is a block diagram showing an example of a configuration of the information processing apparatus.

DETAILED DESCRIPTION OF THE PREFERRED EMBODIMENTS

An information processing apparatus according to the present invention is formed as an information processing apparatus which includes a data storage medium which can store a plurality of pieces of contents such as, for example, a flash memory or a hard disk. The information processing apparatus is formed typically from a personal computer, a contents reproduction apparatus, or a portable device.

A contents management configuration of the information processing apparatus according to the present invention is described with reference to FIG. 1. The information processing apparatus which stores contents therein performs contents management based on a contents management system directory shown in FIG. 1.

Figure 1:
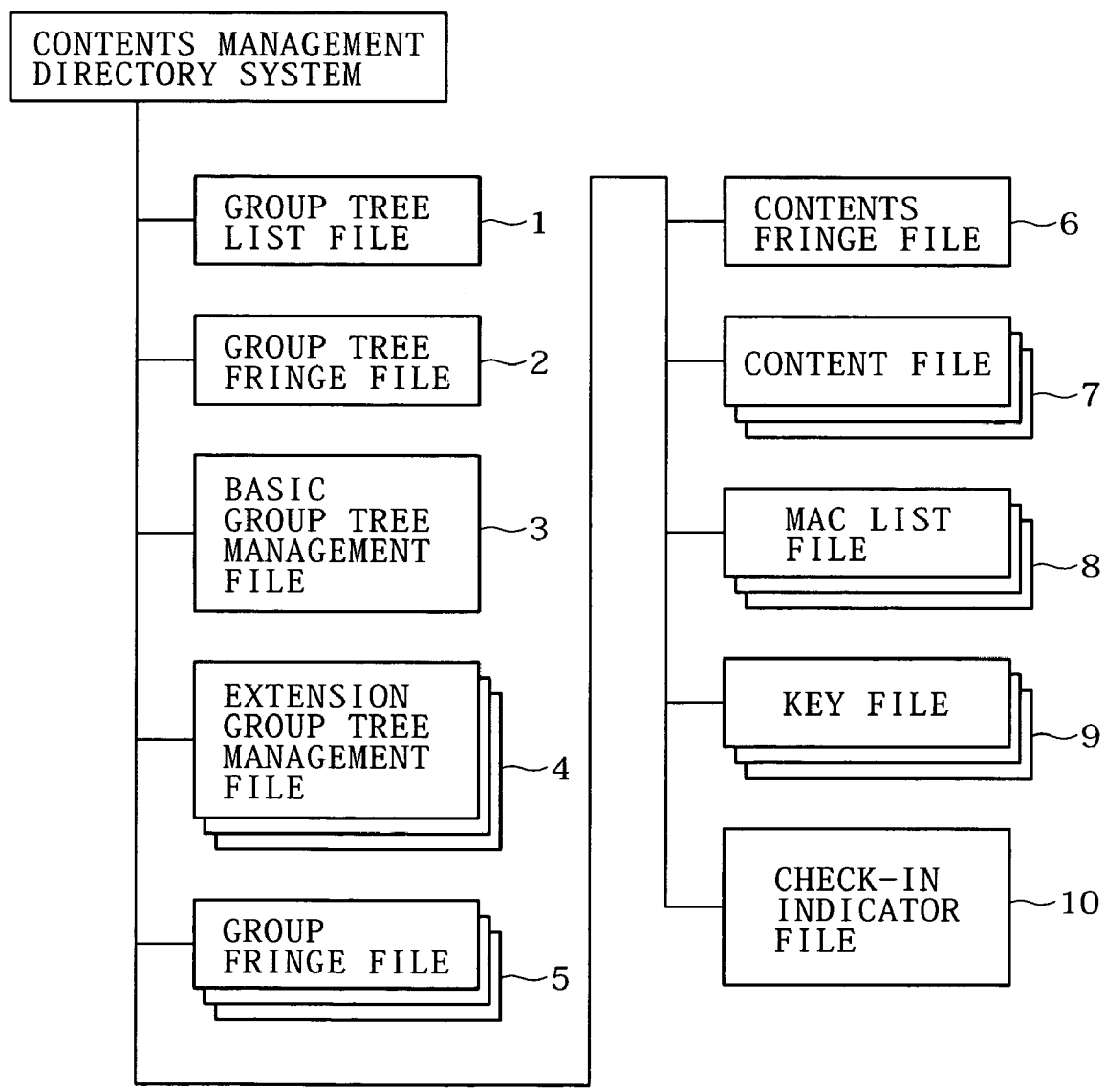
FIG. 1 is a diagrammatic view illustrating an example of a configuration of a contents management directory system applied to an information processing apparatus of the present invention.

An outline of configuration files of the contents management system directory shown in FIG. 1 is described below. It is to be noted that, from among the configuration files of the contents management system directory shown in FIG. 1, individual files which relate to database management and a reproduction list (play list) setting process are described in detail also in later paragraphs.

(1) Group Tree List File

The group tree list file is a reproduction list (play list) table file. It is to be noted that a reproduction list (play list) is defined by a group tree, and various reproduction lists (play lists) stored in the information processing apparatus are defined as group trees different from one another.

(2) Group Tree Fringe File

The group tree fringe file stores fringe data (attribute data) representative of attribute information such as the title of the group tree stored in the information processing apparatus.

(3) Basic Group Tree Management File

The basic group tree management file is a default reproduction list (play list) and a TOC (Table of Contents) file which defines a contents reproduction order.

(4) Extension Group Tree Management File The extension group tree management file is a play list which defines a reproduction order of tracks (contents) separately from the default reproduction order.

(5) Group Fringe File

The group fringe file stores fringe data (attribute data) of a group defined in each group tree.

(6) Contents File

The contents file stores contents data itself.

(7) Contents Fringe File

The contents fringe file stores fringe data (attribute data) of contents.

(8) MAC List File

The MAC list file stores an MAC (Message Authentication Code) as a hash value to be used for checking of falsification of right information of contents.

(9) Key File

The key file stores a key for encrypting and decrypting contents.

(10) Check-In Indicator File

The check-in indicator file is used to manage contents erased by an apparatus having a contents management system such as an external apparatus such as, for example, a portable device (PD) to which contents are outputted, for example, from a PC and records a contents ID and a file No. of erased contents (an erased track).

Now, from among the configuration files of the contents management system directory shown in FIG. 1, individual files which relate to database management and a setting process of a reproduction list (play list) are described in detail.

First, details of the (1) group tree list file are described.

The (1) group tree list file is a reproduction list (play list) table file as described above. It is to be noted that a reproduction list (play list) is defined by a group tree, and various reproduction lists (play lists) stored in the information processing apparatus are defined as group trees different from one another. A group tree is a contents management directory which represents a database configuration for contents management.

The group tree list file is a file which stores table information of reproduction lists (play lists) which are also contents management directories and in which contents reproduction orders are set, and stores table information of various reproduction lists (play lists) (=group trees) stored in the information processing apparatus.

An example of a group tree is shown in FIG. 2.

A group tree corresponds to a contents management directory and a reproduction list (play list), and the contents management system in the information processing apparatus can include a plurality of group trees. The group tree has a layered configuration (tree configuration) wherein each layer is set as a depth for which an attribute can be defined. Details of the depth are hereinafter described.

A track set in the group tree shown in FIG. 2 indicates individual contents. A group can be set as a set which includes one or a plurality of pieces of contents. Each track (piece of contents) which belongs to the group tree belongs to one of the groups.

To each group, a group No. and a depth are defined. The depth 1 corresponds to a layer directly coupled to the root of the highest layer. As lower layers, the depths 2 to 7 are defined successively. The group tree of FIG. 2 is a group tree whose depth number=2.

In the group tree of FIG. 2, the depth 1 is composed of the following groups:

Group 1 including the track 1

Group 2 including the group 3 of the depth 2 which in turn includes the track 2 and the track 3

Group 4 including the track 4 and the track 5

The depth 2 is composed of the following group:

Group 3 including the track 2 and the track 3

The group tree shown in FIG. 2 corresponds also to a play list as contents reproduction order information, and in contents reproduction wherein the group tree is designated, the reproduction order is defined in order of the track 1 to track 5. Then, the reproduction is executed in the order of the block. It is to be noted that reproduction order information is stored in a group tree management file which is set in association with the group tree list. Details of the group tree management file are hereinafter described.

An attribute is defined for each of the depths corresponding to the layers of a group tree. A depth attribute table which is a table of attribute information which can be defined in each depth is illustrated in FIG. 3.

The attributes to be set to each depth include various attributes which can be applied to classification of contents such as, for example, "album name", "title", "artist name", and "composer" as seen in the depth attribute table of FIG. 3.

In the depth attribute table, "depth type" and "value" are coordinated with each attribute. Thus, definition information of each group tree included in the group tree list file has a "depth type" and a "value" set therein as depth information of the group tree.

Figures 4A, 4B, 4C:
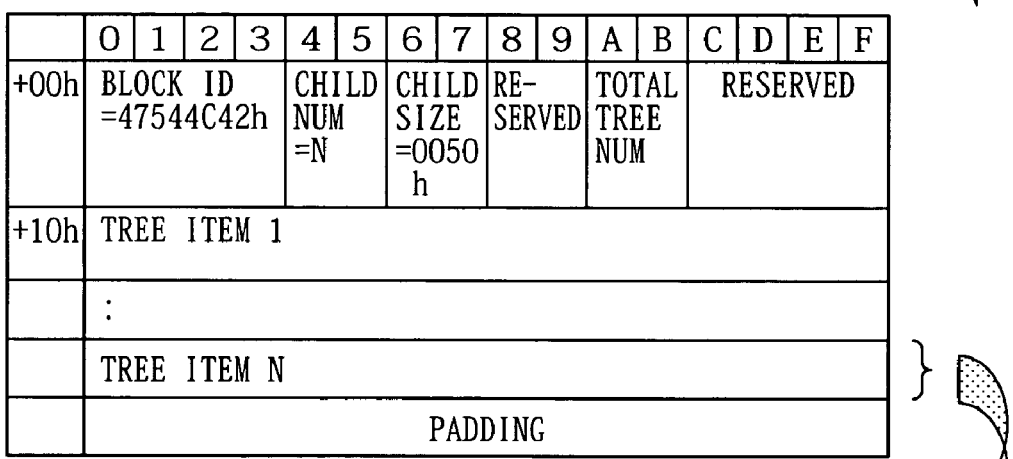
FIGS. 4A to 4C are views illustrating a detailed configuration of a group tree list file produced by or applied to the information processing apparatus.

A detailed configuration of the group tree list file is described with reference to FIGS. 4A to 4C. FIG. 4A illustrates a general configuration of the group tree list file. The group tree list file includes a file header including a format ID and version information, a system block in which system information relating to the contents management system is placed, and a group tree list block in which definition information of group trees is placed.

FIG. 4B illustrates a configuration of the group tree list block. The group tree list block includes definition information such as a block ID of the group tree list block, a child No. (Child Num) representative of the number of items of group trees set as a list. The group tree list block further includes, next to the definition information, tree items 1 to N as information storage regions of the group trees.

FIG. 4C illustrates a configuration of the tree item N. The tree item has the following information placed therein:

Group Tree File Number (GPTree File No.)

The group tree file number (GPTree File No.) represents a unique file No. set to each group tree. Based on the group tree file No., each tree item is coordinated with the (3) basic group tree management file and (4) extension group tree management file corresponding to each group tree which defines reproduction order information of the group tree. Further, based on the group tree file No., each tree item is coordinated with the (5) group fringe file in which fringe information of a group set in the group tree is set.

Coordination of a tree item with the (3) basic group tree management file, (4) extension group tree management file, and (5) group fringe file and details of the files are hereinafter described in detail.

Tree Type (Tree Type)

The tree type has placed therein type information such as whether the tree is a basic group tree set as a TOC (Table of Contents) file defined as a default contents reproduction list or a group tree as some other reproduction list (play list).

Depth Size (Depth Size)

The depth size defines the number of layers which form the group tree. The depth size can be set to 0 to 7. The depth size of the group tree shown in FIG. 2 is 2. For example, the depth of a group tree which includes only a root is 0.

Depth Type

The depth type defines depth types of the number of depths defined by the depth size. As described hereinabove with reference to FIG. 3, the depth type is setting information of various attributes which can be applied to classification of contents such as "album name", "title", "artist name", and "composer". For example, where the attribute of "artist" is set to the depth 1, [TPE1] (refer to FIG. 3) is set to the depth type 1 (Depth Type 1) of FIG. 4C. Further, for example, where the attribute of "album" is set to the depth 2, [TALB] (refer to FIG. 3) is set to the depth type 2 (Depth Type 2) of FIG. 4C.

As described hereinabove, the group tree list has placed therein listed information of all group trees set in the contents management system defined in the information processing apparatus, that is, listed information of all play lists.

Individual information of each group tree recorded as a list in the group tree list is placed in the (3) basic group tree management file, (4) extension group tree management file, and (5) group fringe file illustrated in FIG. 1.

Coordination among the (1) group tree list, (3) basic group tree management file, (4) extension group tree management files, and (5) group fringe files are described with reference to FIG. 5.

The (3) basic group tree management file, (4) extension group tree management file, and (5) group fringe file are set for each group tree in a coordinated relationship with each group tree set in the contents management system.

The (3) basic group tree management file and the (4) extension group tree management file are files which define reproduction order information for each group tree. The (5) group fringe file is a file in which fringe information of a group set in each group tree is placed.

A group tree file No. (GP Tree File No.) (refer to FIG. 4C) which is numbering information unique to a group tree recorded in a tree item of the (1) group tree list specifies the (3) basic group tree management file or (4) extension group tree management file and the (5) group fringe file corresponding to the group tree.

In the following, the (3) basic group tree management file, (4) extension group tree management file, and (5) group fringe file are described in detail.

First, details of the (3) basic group tree management file and (4) extension group tree management file are described. It is to be noted that, as described hereinabove, the (3) basic group tree management file is a default reproduction list (play list) and is a TOC (Table of Contents) file which defines a contents reproduction order while the (4) extension group tree management file is a play list which defines a reproduction order of tracks (contents) separate from the default reproduction order.

A basic group tree management file and an extension group tree management file are set for each group tree. A configuration of the basic and extension group tree management files is described with reference to FIGS. 6A to 6C and 7A to 7C.

Figure 6A:
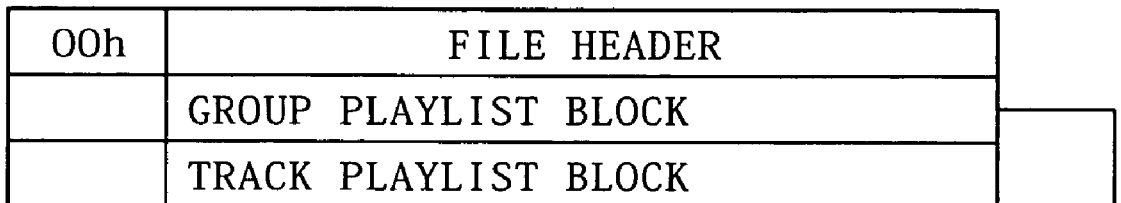

FIG. 6A illustrates a general configuration of a group tree management file (each of basic and extension group tree management files). The group tree management file includes a file header, a group play list block (Group Playlist Block), and a track play list block (Track Playlist Block). The file header is formed from definition information and so forth of the file. The group play list block has placed therein a configuration of the group tree and reproduction order information of the groups. The track play list block has placed therein reproduction order information of tracks (contents).

Figure 6B:
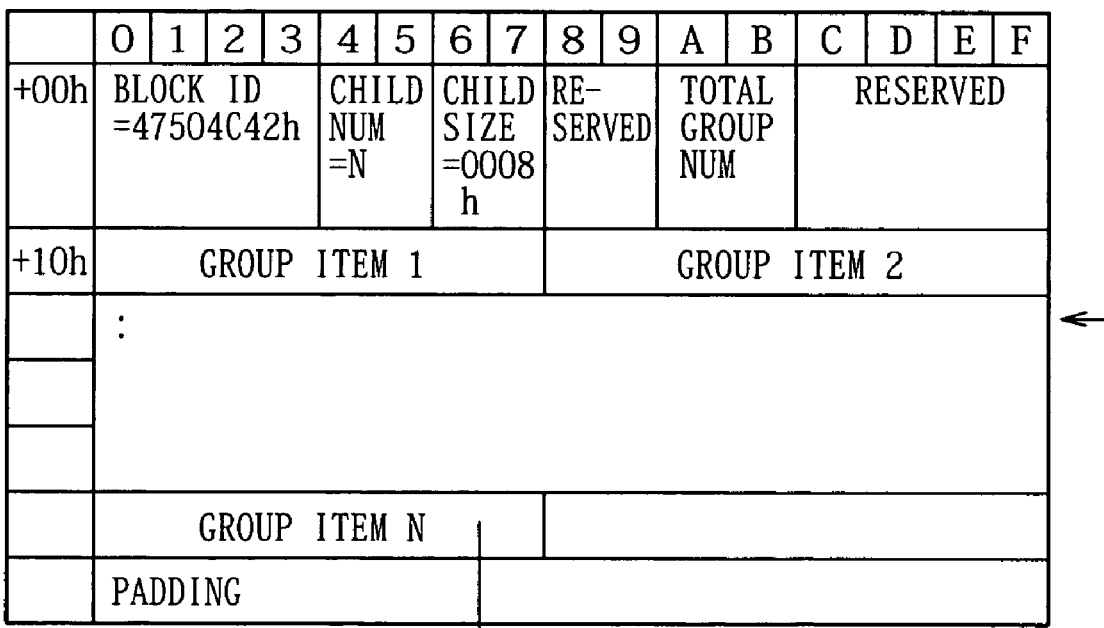

FIG. 6B illustrates a detailed configuration of the group play list block (Group Playlist Block).

The group play list block has set therein definition information such as a block ID (Block ID) of the group play list block, a child No. (Child No.) representative of the number of group items set as the list, and a total group number (Total Group Num). The group play list block further has set therein, next to the definition information, group items 1 to N as information storage regions for the groups.

Figure 6C:
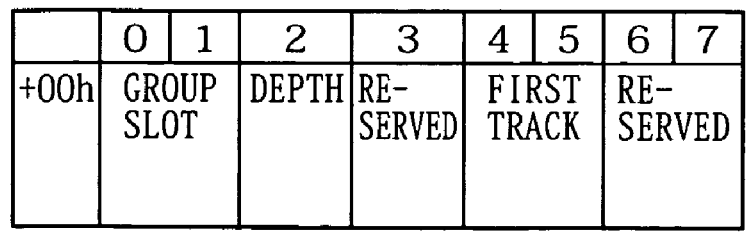

FIG. 6C illustrates a detailed configuration of the group item N.

Group Slot (Group Slot)

The group slot (Group Slot) has recorded therein whether or not fringe information relating to the group is recorded as what numbered group fringe of the group fringe file.

Depth (Depth)

The depth (Depth) has a depth (1 to 7) of the group recorded therein.

First Track (First Track)

The first track has recorded therein a first track No. (contents No.) of the first track belonging to the group.

FIG. 7B illustrates a detailed configuration of the track play list block (Track Playlist Block) of the group tree management file.

The track play list block has set therein definition information such as a block ID (Block ID) of the track play list block and a child No. (Child No.) representative of the number of track items set as the list. The track play list block further has set therein, next to the definition information, track items 1 to N as information storage regions of the tracks.

FIG. 7C shows a detailed configuration of the track item N.

Contents File No. (Contents File No.)

The contents file No. (Contents File No.) defines a contents file number corresponding to the track N.

A reproduction order is defined in order of the group items 1 to N in the group play list block shown in FIG. 6B, and a track (contents) reproduction order in each group is defined as the order of the track items 1 to N in the track play list block illustrated in FIG. 7B.

Now, details of the (5) group fringe file is described. It is to be noted that, as described hereinabove, the (5) group fringe file is a file set for each group tree and stores fringe data (attribute data) of groups defined in each group tree.

A configuration of the (5) group fringe file is described with reference to FIGS. 8A to 8D.

FIG. 8A illustrates a general configuration of a group fringe file. The group fringe file includes a file header including definition information and so forth of the file, and a group fringe block (Group Fringe Block) in which fringe information of all of individual groups of a group tree corresponding to the group fringe file is placed.

FIG. 8B illustrates a detailed configuration of the group fringe block (Group Fringe Block).

The group fringe block includes definition information such as a block ID (Block ID) of the group fringe block and a child No. (Child No.) representative of the number of group fringes placed in the group fringe block. The group fringe block further includes group fringes 1 to N set therein as group fringe information storage regions next to the definition information.

FIG. 8C illustrates a detailed configuration of the group fringe N.

Reproduction Time (Play Time)

The reproduction time (Play Time) has placed therein a total reproduction time period of the group, that is, total reproduction time period information of the tracks (contents) which belong to the group (in a unit of millisecond).

String Number (Num String)

The string number (Num String) has set therein a number of strings as the number of pieces of fringe information of each group.

String Size (Size String)

The string size (Size String) has set therein the size of the storage regions of the fringe information of each group.

String Frames 1 to N

The string frames 1 to N have fringe information of each group individually placed thereon.

FIG. 8D illustrates an example of fringe information of a group.

The fringe information has placed therein attribute information corresponding to the group such as a title and an artist name. While FIG. 8D illustrates an example of pieces of fringe information to which IDs are set, various other pieces of attribute information can be set as fringe information in addition to such pieces of attribute information to which such IDs are set.

Now, a particular example of a configuration of a group tree is described with reference to FIG. 9. A group tree is utilized as a reproduction list (play list) and set as a contents management directory of a database.

Figure 9:
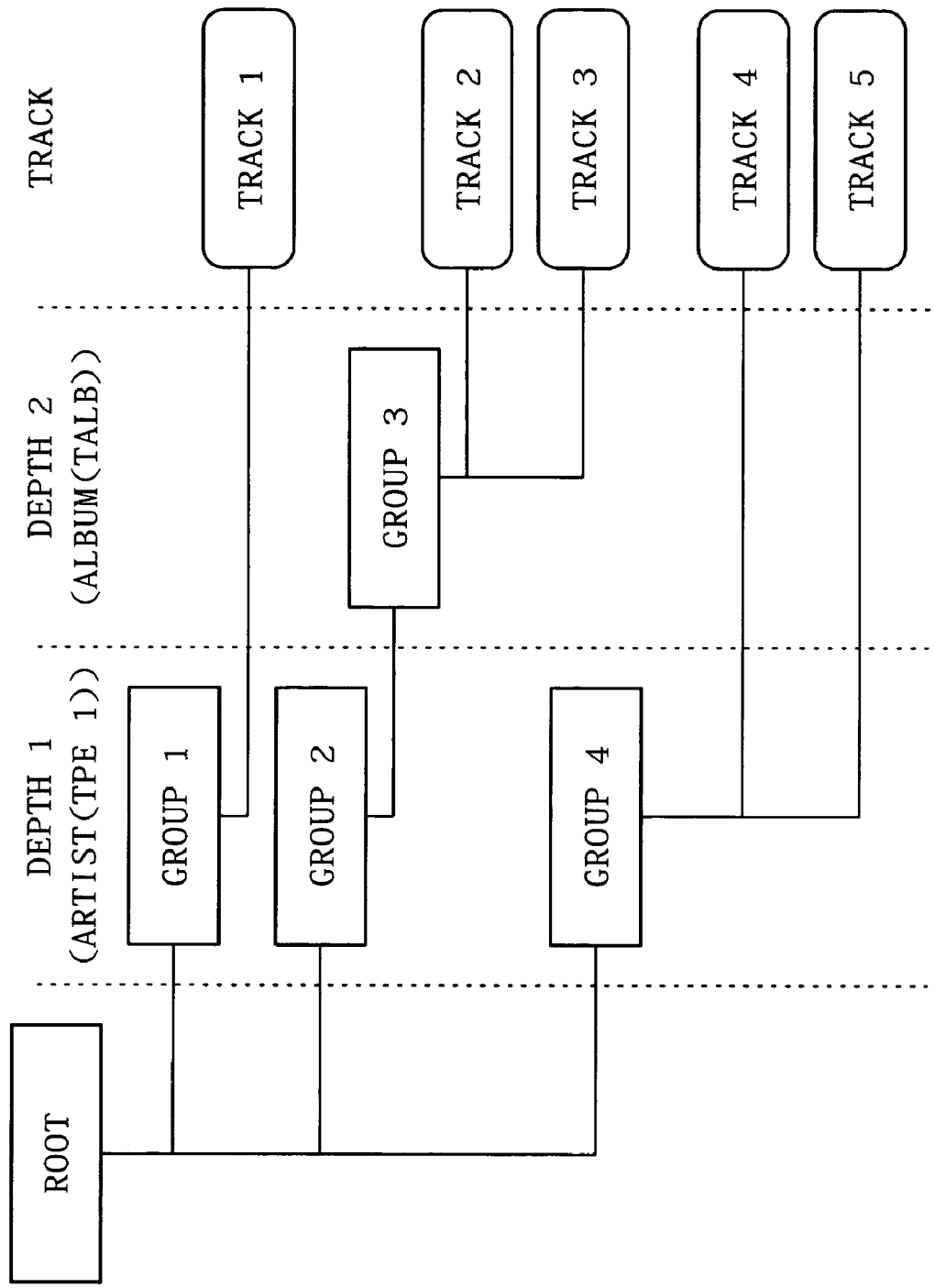
FIG. 9 is a diagrammatic view illustrating an example of a particular configuration of a group tree which is produced by or applied to the information processing apparatus and has depths for which attributes can be defined.

In the group tree of FIG. 9, the depth 1 includes the following groups:

Group 1 including the track 1

Group 2 including the group 3 of the depth 2 which in turn includes the track 2 and the track 3

Group 4 including the track 4 and the track 5

The depth 2 is formed from the following group:

Group 3 including the track 2 and the track 3 In contents reproduction wherein the group tree illustrated in FIG. 9 is designated, the reproduction order is defined in order of the track 1 to track 5, and reproduction is performed successively in the order.

The group tree illustrated in FIG. 9 defines an artist name as an attribute of the depth 1, and an album name as an attribute of the depth 2.

In the group tree wherein the attributes of the depths are defined in this manner, an artist name is recorded in the title name of fringe information corresponding to the groups belonging to the depth 1, that is, the group 1, group 2, and group 4, and an album name is recorded in the title name of fringe information of the group belonging to the depth 2, that is, the group 3.

The group tree shown in FIG. 9 is utilized as a reproduction list (play list) and set as a contents management directory of a database. A process where browsing of contents is executed, for example, in a contents search by a user is described.

In a GUI presented on a display unit of the information processing apparatus, upon browsing of contents, the management configuration of the contents in the database can be presented such that the first layer (depth 1)="artist name", second layer (depth 2)="album name", and third layer="track name" (contents name) to the user.

In particular, it is possible to apply the directory configuration corresponding to the group tree to allow the user to browse the tracks (contents) in order of the artist name→album name→track name.

Coordination among a group tree list corresponding to the group tree of FIG. 9, a group tree management file, and a group fringe file are described with reference to FIG. 10.

As described hereinabove, a group tree management file and a group fringe file are set for each group tree in a coordinated relationship with each of the group trees set in the contents management system.

Figure 10:
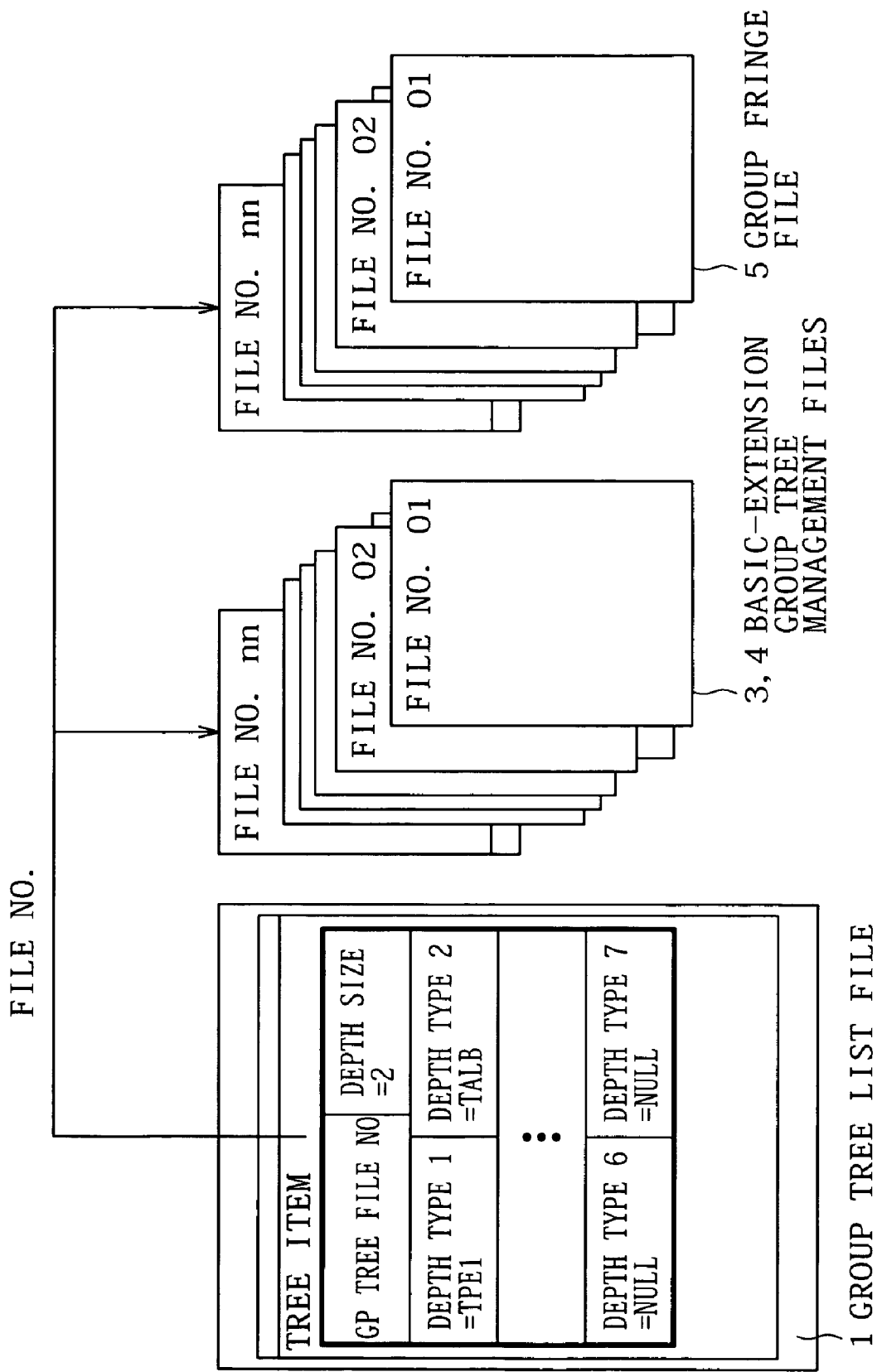
FIG. 10 is a diagrammatic view illustrating setting of a group tree list file, group tree management files, and group fringe files corresponding to the group tree illustrated in FIG. 9.

A group tree file No. (GP Tree File No.) (refer to FIG. 4C) which is numbering information unique to a group tree recorded in a tree item of the group tree list shown in FIG. 10 specifies a group tree management file and a group fringe file corresponding to the group tree.

In the group tree corresponding to FIG. 9, the depth number (Depth Size) is 2; the attribute of the depth 1 is "artist name"; and in the depth type 1 (Depth type1), a depth type (Depth Type)=[TPE1] corresponding to the "artist name" is set. Further, the attribute of the depth 2 is "album", and in the depth type 2 (Depth Type2), a depth type (Depth Type)=[TALB] corresponding to the "album" is set.

In the group tree shown in FIG. 9, the depth number is 2, and since the group tree does not include the depth 3 or more, [NULL] is placed in the storage regions for the depth types for the depth 3 or more.

As attributes of the depths, various attributes which can be applied to classification of contents such as "album name", "title", "artist name", and "composer" can be set as described hereinabove with reference to FIG. 3.

If a group tree is utilized, then a contents management database having an arbitrary layered configuration favorite to a user which defines various depth attributes corresponding to the depth attribute table shown in FIG. 3 can be constructed. In particular, through a process of setting a directory having depths (layers) which define various attributes, setting groups in a coordinated relationship with the attribute definition depths, and setting a lower order group with respect to a group to a depth having a different definition, a large amount of contents stored in a database can be divided into groups and each group can be set to a directory which is formed from attribute definition depths (layers). Consequently, construction of a database which can be utilized readily by a user can be executed efficiently. Further, search or browsing of contents wherein a depth attribute is applied can be executed based on the thus constructed database.

As described hereinabove, a group tree can be utilized as a contents reproduction list (play list). In particular, a contents reproduction order of groups and tracks (contents) of each individual group tree is prescribed by the group tree management list, and a user can set a reproduction list (play list) by selecting a group tree.

As described hereinabove, a reproduction order of contents of each group is prescribed in a unit of a group and a track (piece of contents) by the group tree management list, and if a user selects a group tree, then a reproduction order of groups and contents (tracks) as components of the group tree is set.

Accordingly, a user can extract and browse tracks (contents) in the order of, for example, the artist name→album name→track name in accordance with definition attributes of the depths. Further, the user can simultaneously acquire a contents reproduction list prescribed in the group tree by a browse process. In this manner, the user can perform contents search efficiently in accordance with the definition attributes of the depths and can acquire a reproduction list.

It is to be noted that also it is possible to construct a user-oriented database conforming to the preference of the user readily by performing setting of a new group tree. In particular, by freely combining depth types (Depth Type) corresponding to the depth attributes illustrated in FIG. 3 to set attributes of the depths and setting groups to the depths having the defined attributes, a contents management database having an arbitrary directory configuration conforming to the preference of the user can be set.

Furthermore, by setting, as a GUI to be applied to a construction process of a database by a user, that is, a setting process of a group tree, a GUI wherein various attributes which can be applied to classification of contents, for example, as attributes as text character strings such as, for example, "album name", "title", "artist name", and "composer", can be inputted, even a user who is not familiar to a database can construct a database readily.

If the user inputs character strings corresponding to attributes such as, for example, "album name" and "title" as attribute information corresponding to the depths using a GUI, then a database production program of the information processing apparatus refers to the depth attribute table illustrated in FIG. 3 to acquire the "depth type" and the "value" based on the input character strings and produces a group tree management file and a group fringe file.

Since such a process as just described can be executed to construct a new group tree, even if the user does not have knowledge regarding a directory configuration of a database, the user can easily construct a new group tree, that is, a contents reproduction list and a contents management database based on the depth definitions set by the user.

Figure 11:
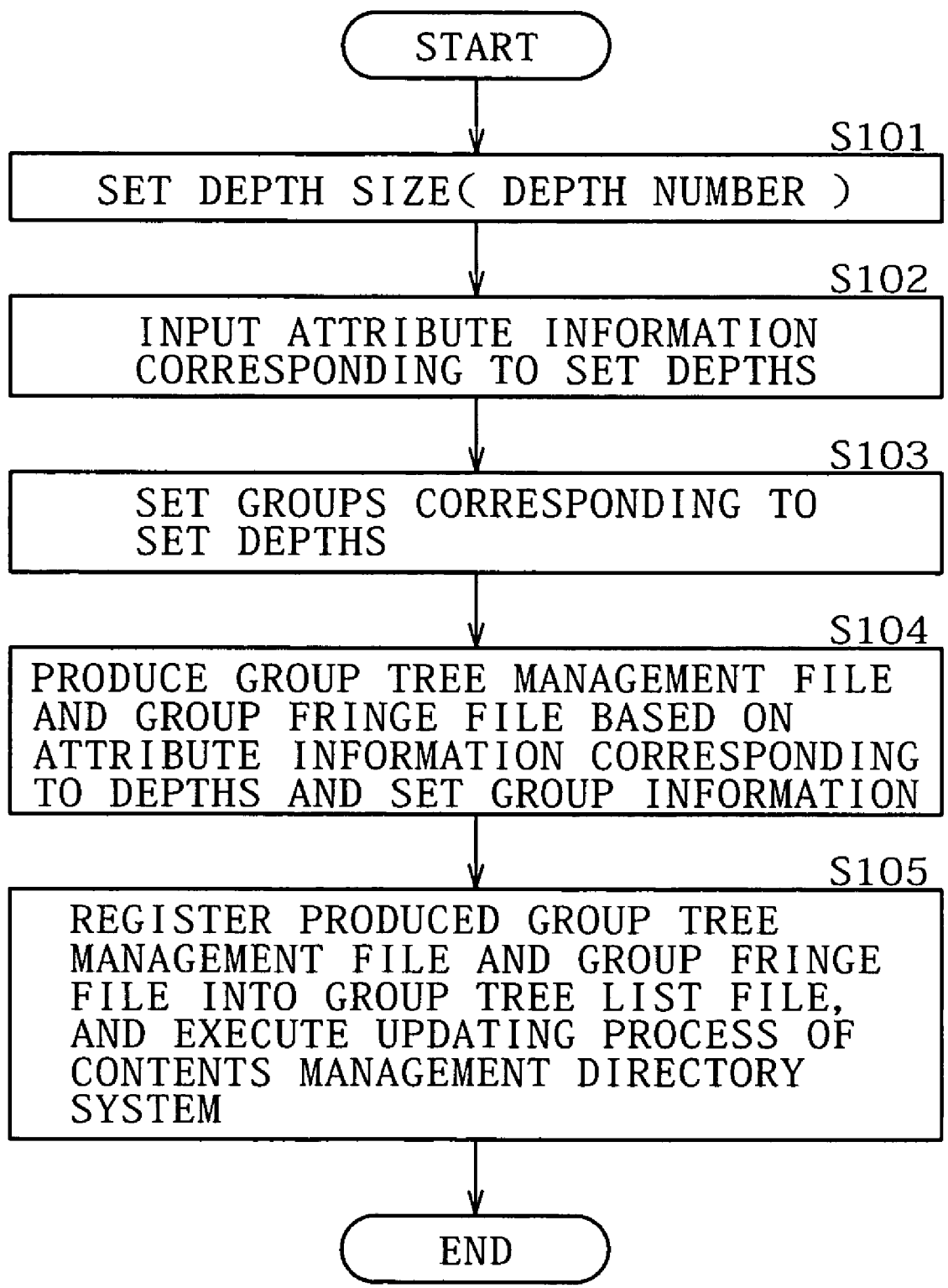
FIG. 11 is a flow chart illustrating a procedure of a production process of a database and a play list executed as a setting process of a new group tree by the information processing apparatus.

FIG. 11 illustrates a production process of a group tree which involves a setting process of depth definitions by a user, that is, a production processing procedure of a contents reproduction list and a contents management database.

Referring to FIG. 11, first at step S101, a depth size (depth number) is set. In the setting of a depth size (depth number), either the database production program automatically sets the depth size (depth number) based on a default value set in advance, a value of the depth type (refer to FIG. 3), or the like or else the user sets a depth size (depth number) on a GUI displayed on the display unit of the information processing apparatus. It is to be noted that a presentation process of the GUI is executed by the database production process.

Then at step S102, corresponding attribute information is coordinated with the depths set in this manner. The process coordinates various processes which can be applied to classification of contents such as, for example, the "album name", "title", "artist name", and "composer". The process is executed by the database production process based on information registered in advance, or else, attribute information corresponding to each depth is coordinated by an input of the user.

At step S103, groups corresponding to each of the depths set as described above are arranged. Each of the groups may be a group set in advance or may otherwise be a new group set based on a track or tracks (contents) selected by the user. This process may be a process based on the database production process or may alternatively be a process based on an input of the user.

Then at step S104, a group tree management file and a group fringe file are produced based on the attribute information corresponding to the depths and the setting group information. This process is basically executed by the database production program, and produces a group tree management file and a group fringe file by referring to the depth attribute table illustrated in FIG. 3 to acquire necessary values and successively setting the groups set by the user.

Then at step S105, the group tree management file and the group fringe file produced in this manner are registered into a group tree list file, and an updating process of the contents management directory system is executed. Also this process is basically executed by the database production program.

In this manner, the user can produce a new group tree only by executing a process of setting a depth size (depth number), setting attributes to the depths, and designating groups to be arranged in the depths. Thus, the user can produce a database having a directory configuration conforming to the preference of the user and a play list which defines a contents reproduction order.

Now, an example of a configuration of the information processing apparatus which executes the various processes described hereinabove is described with reference to FIG. 12. The information processing apparatus which executes the processes described above is formed from a PC or an information processing apparatus which includes a storage medium for storing contents such as, for example, a portable device, and a CPU serving as a data processing element for executing the data processing program.

Referring to FIG. 12, a CPU (Central Processing Unit) 101 is a control section for executing various processes in accordance with various computer programs including an OS (Operating System), a contents reproduction processing program, and the database production program. Further, the CPU 101 executes, as contents encryption and decryption processes upon external outputting (checkout) of contents, an encryption process to which an algorithm such as, for example, the DES (Data Encryption Standard) algorithm is applied. The CPU 101 further executes an authentication and session key sharing process with an external apparatus upon inputting and outputting of contents.

A ROM (Read Only Memory) 102 stores programs to be used by the CPU 101, fixed data from among various parameters for arithmetic operation, and so forth. In particular, the contents reproduction processing program, database production program, and so forth are stored in the ROM 102. A RAM (Random Access Memory) 103 stores programs to be used in execution by the CPU 101, parameters which suitably vary during the execution and so forth. The CPU 101, ROM 102, and RAM 103 are connected to each other by a host bus 104 which may be formed from a CPU bus or the like.

The host bus 104 is connected to an external bus 106 such as a PCI (Peripheral Component Interconnect/Interface) bus through a bridge 105.

A keyboard 108 is operated by the user in order to input various instructions to the CPU 101. A pointing device 109 is operated by the user in order to designate or select a point on a screen of a display unit 110. The display unit 110 is formed from a liquid crystal display unit or a CRT (Cathode Ray Tube) and displays various kinds of information in the form of a text or an image. An HDD (Hard Disk Drive) 111 drives a hard disk to record or reproduce a program or information to be executed or used by the CPU 101.

A drive 112 reads out data or a program recorded on a removable recording medium 120 loaded therein such as a magnetic disk, an optical disk, a magneto-optical disk, a semiconductor memory, or the like and supplies the data or program to the RAM 103 connected thereto through an interface 107, the external bus 106, the bridge 105, and the host bus 104.

A PD (Portable Device) connection port 114 is a port for connection of a portable device, and a portable device is connected to the PD connection port 114 through a connection of a USB, an IEEE 1394 cable, or the like. The PD connection port 114 receives data such as contents, a command of a portable device 122, or the like supplied from the HDD 111, CPU 101, RAM 103, or the like through the interface 107, external bus 106, bridge 105, host bus 104, and so forth and outputs the received data or command to the portable device 122.

A sound input/output interface 115 executes an interface process for a digital sound input/output or an analog sound input/output having, for example, an IEC (International Electro technical Commission) 60958 terminal. The sound input/output interface 115 is connected to an outputting element such as a speaker so that the outputting element executes sound outputting corresponding to contents based on a sound signal supplied thereto from the sound input/output interface 115.

The components from the keyboard 108 to the sound input/output interface 115 described above are connected to the interface 107, which is in turn connected to the CPU 101 through the external bus 106, bridge 105, and host bus 104.

A communication section 116 is connected to a network, and places data (for example, a request for transmission of contents, a request for user registration, or the like) supplied thereto from the CPU 101, HDD 111 or the like into a packet of a predetermined format and transmits the packet through the network. Further, the communication section 116 receives a packet through the network and outputs data such as, for example, contents placed in the received packet to the CPU 101, RAM 103, or HDD 111.

It is to be noted that the series of processes described above can be executed by hardware, software, or a composite configuration of hardware and software. Where the series of processes is executed by software, a program recording the processing sequence is installed into a memory in a computer incorporated in hardware for exclusive use so that the computer may execute the program. Alternatively, the program is installed into a computer for universal use which can execute various processes so that the computer may execute the program.

For example, the program may be recorded on a hard disk or in a ROM (Read Only Memory) as a recording medium in advance thereon. Alternatively, the program may be temporarily or permanently stored on a removable recording medium such as a flexible disk, a CD-ROM (Compact Disc-Read Only Memory), an MO (Magneto-Optical) disk, a DVD (Digital Versatile Disc), a magnetic disk, or a semiconductor memory. Such a removable recording medium as just described can be provided as package software.

It is to be noted that the program may not only be installed from such a removable recording medium into a computer but also be transferred from a download site by radio communication into a computer or transferred by wire communication through a LAN (Local Area Network) or the Internet to a computer. The computer thus can receive the program transferred in this manner and install the program into a recording medium built therein such as a hard disk.

It is to be noted that the processes disclosed in the present specification may be executed in a time series in the order as described or may be executed parallelly or individually depending upon the processing capacity of an apparatus used for the processes or as occasion demands. Further, in the present specification, the term "system" is used to represent a logical set apparatus composed of a plurality of apparatus, which may be included in the same housing or may be provided discretely.

While the preferred embodiments of the present invention have been described using specific terms, such description is for illustrative purposes only, and it is to be understood that changes and variations may be made without departing from the spirit or scope of the following claims.

What is claimed is:

1. An information processing apparatus comprising:
at least one storage component for storing a plurality of pieces of content; and
at least one data processing component for:
setting a directory having a tree structure;
setting by a user layer attribute information representative of attributes of layers which form the tree structure, wherein the attributes facilitate classification of the pieces of content; and
coordinating each attribute of the layer attribute information with a group which includes contents or a group belonging to a lower layer than a layer indicated by the attribute to produce a group tree composed of groups and the contents, wherein the group tree is coordinated with a basic group tree management file, an extension group tree management file, and a group fringe file set for the group tree based on a file number of the group tree recorded in a tree item of a group tree list, wherein the basic group tree management file defines a default reproduction order of the contents and the extension group tree management file defines a reproduction order of the contents that is separate from the default reproduction order, and wherein the directory facilitates content management that conforms to a preference of the user and construction of a reproduction list.

2. The information processing apparatus according to claim 1, wherein said at least one data processing component produces a group tree management file in which a contents reproduction order corresponding to the group tree is defined.

3. The information processing apparatus according to claim 2, wherein said at least one data processing component produces the group tree management file as a file in which a reproduction order of groups in the group tree is defined and a reproduction order of pieces of content in the group tree is defined.

4. The information processing apparatus according to claim 2, wherein said at least one data processing component sets the group tree management file as a file associated with registration information of a group tree list file set as list information of a plurality of group trees.

5. The information processing apparatus according to claim 1, wherein said at least one data processing component produces, as a data file associated with registration information of a group tree list file set as list information of a plurality of group trees, the group fringe file in which group attribute information representative of attributes of groups set to the group trees is placed.

6. The information processing apparatus according to claim 1, wherein said at least one data processing component acquires code data coordinated with attribute information which can be set as the layer attribute information based on a layer attribute table wherein attribute information and code information are coordinated with each other, and places the code data into group tree information set in a group tree list file set as list information of a plurality of group trees.

7. An information processing apparatus according to claim 1, further comprising the least one data processing component for:
inputting character strings corresponding to the attributes corresponding to depths of the layers; and
producing a group tree management file and a group fringe file to construct a new group tree based on the attributes corresponding to the depths.

8. An information processing apparatus comprising:
at least one storage component for storing a plurality of pieces of content; and
a control component for producing:
a group tree list file formed from group tree identification information for identification of group trees having a tree structure, layered order information representative of a layer order of layers of each of the group trees, and layer attribute information representative of attributes of the layers, wherein the layered order information and the layer attribute information are set by a user and wherein the attributes facilitate classification of the pieces of content;
a group tree management file representative of the group tree identification information for identification of the group trees and a reproduction order of the contents belonging to the group trees, wherein a basic group tree management file and an extension group tree management file are set for each group tree, and wherein the basic group tree management file defines a default reproduction order of contents of the group tree and the extension group tree manaaement file defines a reproduction order of the contents of the group tree that is separate from the default reproduction order; and
a group attribute information file representative of attributes of the groups, with the attributes stored as a group fringe file set for each group tree, wherein each group tree is coordinated with the basic group tree management file, the extension group tree management file, and the group fringe file based on a file number of the group tree, and wherein each group tree is utilized as a reproduction list and set as a content management directory that conforms to a preference of the user.

9. An information processing method for producing a group tree formed from groups and a plurality of pieces of content and used for management of the content, the method comprising:
setting a directory having a tree structure;
setting by a user layer attribute information representative of attributes of layers included in the tree structure, wherein the attributes facilitate classification of the pieces of content; and
setting each of pieces of the layer attribute information with a group which includes contents or a group belonging to a lower layer than the layer indicated by the piece of the layer attribute information in a coordinated relationship with each other, wherein the group tree is coordinated with a basic group tree management file, an extension group tree management file, and a group fringe file set for the group tree based on a file number of the group tree, wherein the basic group tree management file defines a default reproduction order of the contents and the extension group tree management file defines a reproduction order of the contents that is separate from the default reproduction order, and wherein the directory facilitates content management that conforms to a preference of the user and construction of a reproduction list.

10. The information processing method according to claim 9, further comprising a step of executing a process of producing a group tree management file in which a contents reproduction order corresponding to the group tree is placed and forming the group tree as a configuration which can be applied as the reproduction list which prescribes a contents reproduction order.

11. The information processing method according to claim 10, wherein the group tree management file is produced as a file in which a reproduction order of groups in the group tree is defined and a reproduction of pieces of content in the group tree is defined.

12. The information processing method according to claim 9, wherein the group tree management file is set as a data file associated with registration information of a group tree list file set as list information of a plurality of group trees.

13. The information processing method according to claim 9, wherein, as a data file associated with registration information of a group tree list file set as list information of a plurality of group trees, the group fringe file, in which group attribute information representative of attributes of groups set to the group trees is placed, is produced.

14. The information processing method according to claim 9, further comprising a step of acquiring code information coordinated with attribute information which can be set as the layer attribute information based on a layer attribute table, wherein the attribute information and the code information are coordinated with each other, and a step of placing the code information into group tree information set in a group tree list file set as list information of a plurality of group trees.

15. A computer-readable storage medium encoded with a computer program for producing a group tree as a contents management directory formed from groups and a plurality of pieces of content and used for management of the content, the computer program comprising computer executable steps of:
setting a directory having a tree structure;
setting by a user layer attribute information representative of attributes of layers included in the tree structure, wherein the attributes facilitate classification of the pieces of content; and
setting each of pieces of the layer attribute information with a group which includes contents or a group belonging to a lower layer than the layer indicated by the piece of the layer attribute information in a coordinated relationship with each other, wherein a file number of the group tree is coordinated with a basic group tree management file, an extension group tree management file, and a group fringe file set for the group tree based on a file number of the group tree, wherein the basic group tree management file defines a default reproduction order of the contents and the extension group tree management file defines a reproduction order of the contents that is separate from the default reproduction order, and wherein the directory facilitates content management that conforms to a preference of the user and construction of a reproduction list.

16. A contents browsing apparatus comprising:
at least one storage component for storing a plurality of pieces of content;
a display component for displaying the substance of the content; and
a control component for controlling said display component to display the substance of the content based on a group tree list file formed from group tree identification information for identification of group trees each having a tree structure, layered order information representative of a layer order of layers of each of the group trees and layer attribute information representative of attributes of the layers, wherein the layered order information and the layer attribute information are set by a user and wherein the attributes facilitate classification of the pieces of content, a basic group tree management file and an extension group tree management file representative of the group tree identification information for identification of the group trees and a reproduction order of the contents belonging to the group trees, and a group attribute information file representative of attributes of the groups, with the attributes stored in a group fringe file set for each group tree, wherein a file number of each group tree is coordinated with the basic group tree management file, the extension group tree management file, and the group fringe file based on a file number of the group tree, wherein the basic group tree management file defines a default reproduction order of contents of the group tree and the extension group tree management file defines a reproduction order of the contents of the group tree that is separate from the default reproduction order, and wherein each group is utilized as a reproduction list and set as a content management directory that conforms to a preference of the user.

* * * * *